United States Patent [19]
Yamazaki

[11] Patent Number: 5,150,204
[45] Date of Patent: Sep. 22, 1992

[54] SOLID STATE IMAGE PICKUP HAVING PLURAL PIXELS ARRANGED ON PLURAL LINES

[75] Inventor: Yasuyuki Yamazaki, Ohmiya, Japan

[73] Assignee: Canon Kabushiki Kaisha, Tokyo, Japan

[21] Appl. No.: 341,547

[22] Filed: Apr. 21, 1989

[30] Foreign Application Priority Data

Apr. 27, 1988 [JP] Japan ................. 63-102411
Apr. 27, 1988 [JP] Japan ................. 63-102413

[51] Int. Cl.⁵ .......................... H04N 9/077
[52] U.S. Cl. ......................... 358/44; 358/43
[58] Field of Search ............ 358/41, 43, 44, 47, 358/29, 29 C

[56] References Cited

U.S. PATENT DOCUMENTS

| | | | |
|---|---|---|---|
| 4,641,183 | 2/1987 | Kinoshita | 358/41 |
| 4,751,567 | 6/1988 | Hashimoto | 358/43 |
| 4,887,252 | 12/1989 | Miyakawa et al. | 358/44 |

FOREIGN PATENT DOCUMENTS

| | | |
|---|---|---|
| 0133835 | 3/1985 | European Pat. Off. |
| 0103486 | 6/1984 | Japan |
| 0248693 | 11/1986 | Japan |
| 0154891 | 7/1987 | Japan |
| 0269588 | 11/1987 | Japan |

OTHER PUBLICATIONS

All Solid State Color Camera with Single Chip MOS Imager, Nabeyama et al., pp. 40-46, IEEE Transaction on Consumer Electronic, vol. CE-27, Feb. 1981.

Primary Examiner—Howard W. Britton
Assistant Examiner—Kim Yen Vu
Attorney, Agent, or Firm—Fitzpatrick, Cella, Harper & Scinto

[57] ABSTRACT

An image pickup apparatus includes: a solid state image pickup device having pixels displaced by a ½ pixel pitch between two adjacent horizontal lines; a circuit for reading every second horizontal line and outputting read-out signals onto a plurality of channels; and a luminance signal generating circuit for generating switching pulses for dot-sequentializing the read-out signals onto the plurality of channels to obtain a luminance signal, the switching pulses having a phase shift of 180 degrees between first and second fields.

19 Claims, 9 Drawing Sheets

SOLID STATE IMAGE PICKUP HAVING PLURAL PIXELS ARRANGED ON PLURAL LINES

BACKGROUND OF THE INVENTION

1. Field of the Invention

The present invention relates to an image pickup apparatus using a solid state image pickup device.

2. Related Background Art

A conventional MOS image pickup device used in a single CCD area array type camera is constructed as shown in FIG. 1. In FIG. 1, PE represents a photocell, PS a cell selection switch, VA a vertical shift register, HS a horizontal shift register, IL an interlace circuit, and CS a column switch which is turned on and off in response to outputs from the horizontal shift register. The resolution of such a solid state camera is determined primarily by the number of pixels. It is difficult to increase considerably the number of pixels because of restrictions by manufacturing processes, high aperture rate, driving speed and the like.

In order to improve the horizontal resolution without increasing the number of pixels, an image pickup device of a so-called "pixel displacement type" has been proposed, the construction of which is shown in FIG. 2.

In FIG. 2, three color filters Cy, W and Ye are used, one unit being composed of filters disposed over two lines in a triangular shape. A horizontal scan is effected in units of filters disposed in a triangular shape. Three color signals are outputted onto respective signal lines within the baseband. The misalignment between spacial positions and signal timings is corrected by delay lines provided outside of the device, in the manner as illustrated in FIG. 3. In the Figure, H clocks are shift clocks from the horizontal shift register HS.

Using the obtained signals, the color and luminance signals are calculated by the following equations at a matrix circuit.

$$R = W - Cy$$

$$B = W - Ye$$

$$G = Cy + Ye - W$$

$$Y = Cy + W + Ye$$

As described above, in order to correct the misalignment between spatial positions and output signal timings, it is necessary to provide delay lines outside the image pickup device. However, if there is a difference in phase and amplification factor of the delay lines, interference signals within the bandwidth of the luminance signal appear on the displayed image. Thus, it is required to use delay lines having high precision phase and amplification factor.

In addition, there arises a problem that it is difficult to use delay lines having the same characteristic because the characteristic varies with each delay line.

SUMMARY OF THE INVENTION

It is therefore an object of the present invention to provide an image pickup apparatus capable of obtaining an image of high horizontal resolution without using high precision delay lines.

In order to achieve the above object, the image pickup apparatus of the first embodiment of this invention comprises: a solid state image pickup device having pixels displaced by ½ pixel pitch between two adjacent horizontal lines; means for reading every second horizontal line and outputting read-out signals onto a plurality of channels; and luminance signal generating means for generating switching pulses for dot-sequentializing said read-out signals onto said plurality of channels to obtain a luminance signal, said switching pulses having a phase shift of 180 degrees between first and second fields.

According to the first embodiment, in producing a luminance signal by selectively switching output signals from a solid state image pickup device of a so-called "½ pixel displacement type", the phase of switching pulses is shifted by 180 degrees between the first and second fields in the case of interlaced scanning with one line reading from frame storage, to thereby obtain an image of high horizontal resolution without using high precision delay lines as conventional.

Further, in order to achieve the above object, the image pickup apparatus of the second embodiment of this invention comprises: a solid state image pickup device having pixels displaced by a ½ pixel pitch between two adjacent horizontal lines; means for reading two horizontal lines at the same time and outputting read-out signals onto three output channels; and means for generating switching pulses for dot-sequentializing said read-out signals onto said three output channels to obtain a luminance signal, the frequency of said switching pulse being set 1.5 times as high as that for one line reading.

According to the second embodiment, in producing the luminance signal by selectively switching output signals from a solid state image pickup device of a so-called "½ pixel displacement type", the two line simultaneous reading is performed using switching pulses whose frequency is set 1.5 times as high as, for example, that for interlaced scanning with one line reading from frame storage, to thereby obtain an image of high horizontal resolution without using high precision delay lines as in conventional system.

The above and other objects, and advantages of the present invention will become more apparent from the following detailed description when read in connection with the accompanying drawings.

DETAILED DESCRIPTION OF THE PREFERRED EMBODIMENTS

Figure 1:
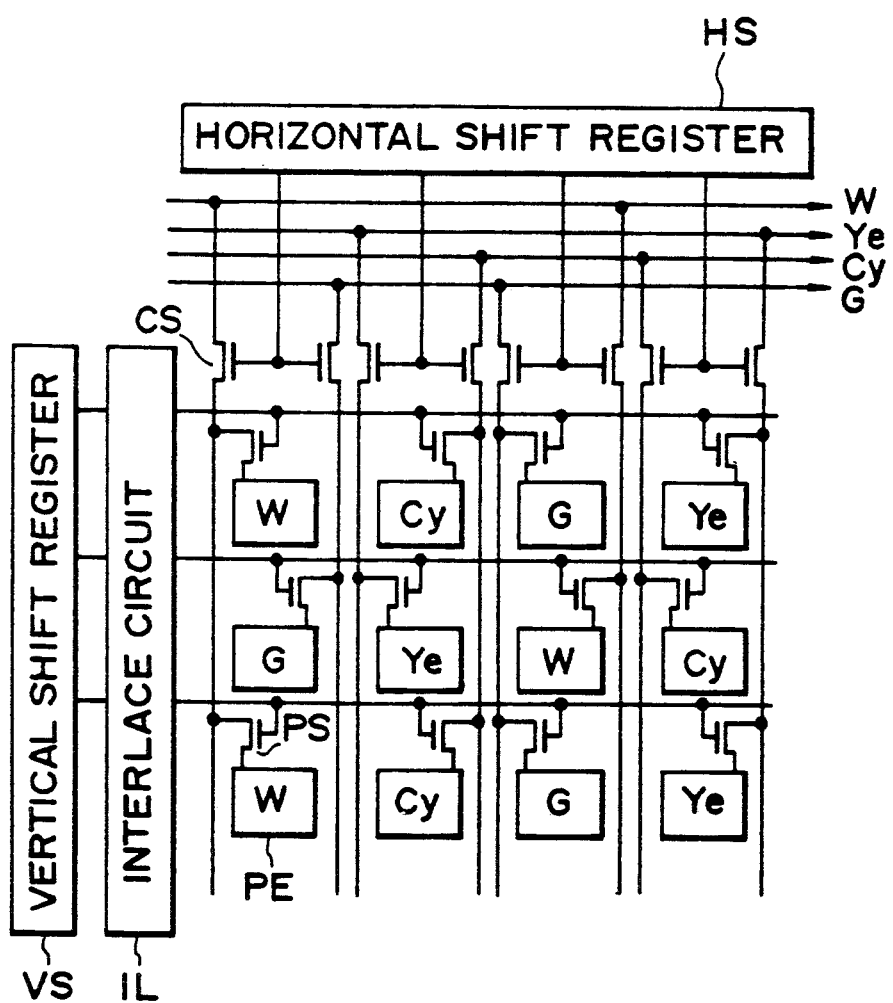
FIGS. 1 and 2 show the structure of conventional MOS type image pickup devices.
Figure 2:
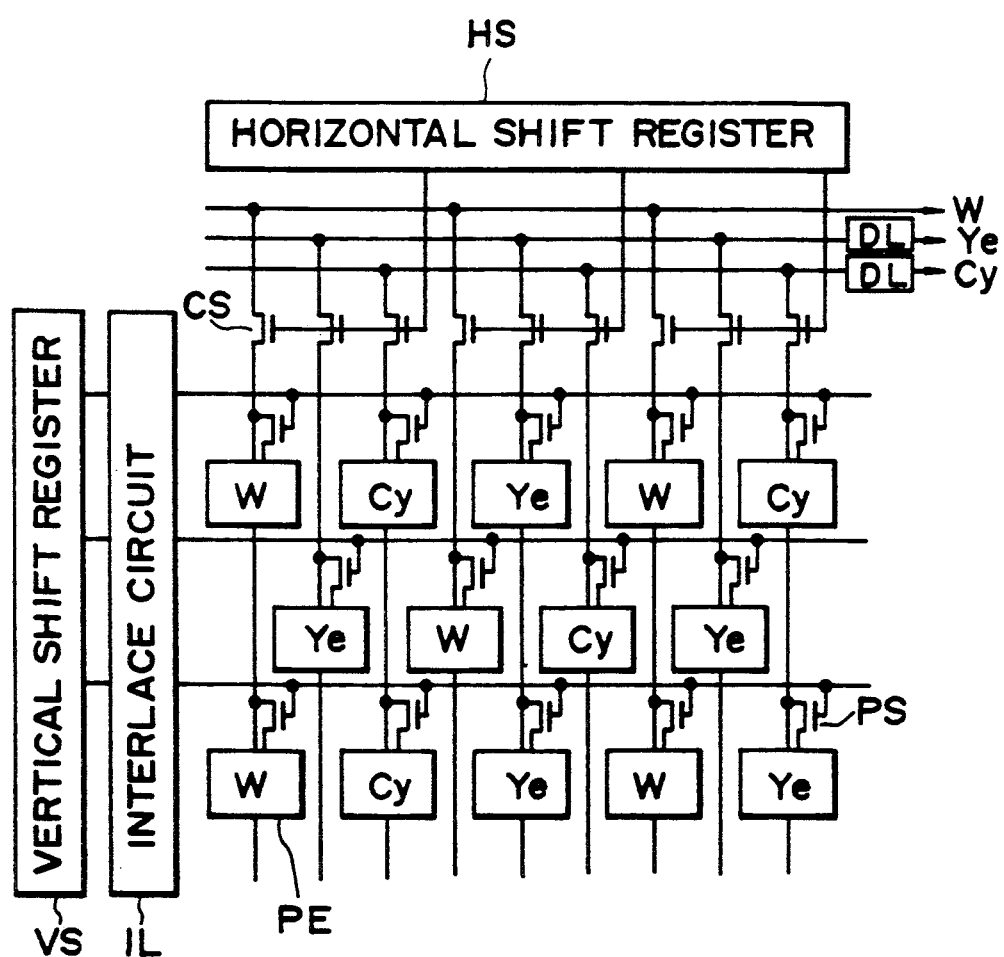
Figure 3:
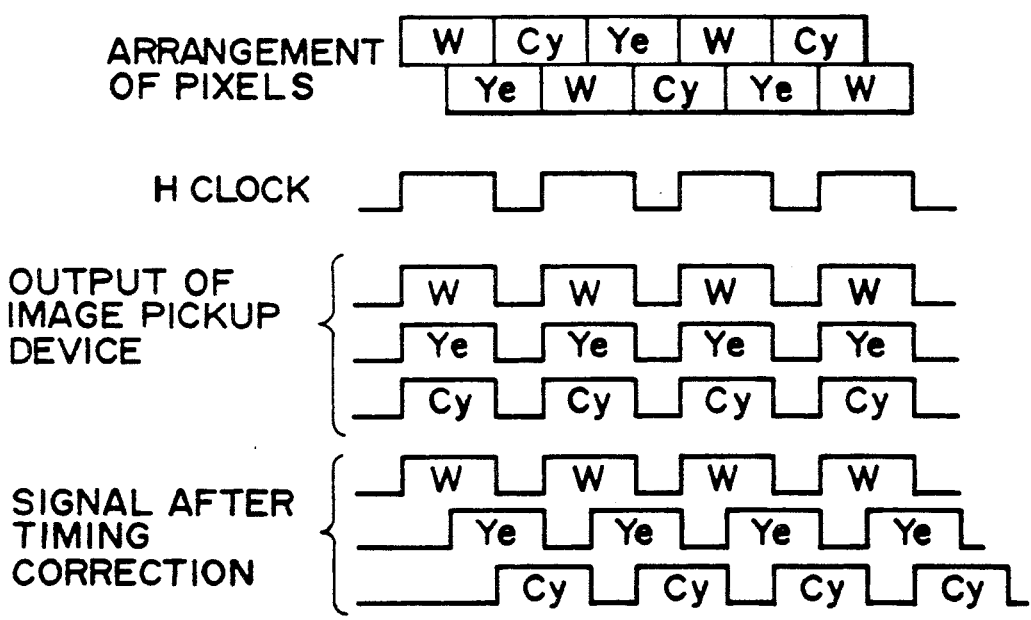
FIG. 3 is a timing chart illustrating the operation of reading signals from the image pickup device shown in FIG. 2.
Figure 4:
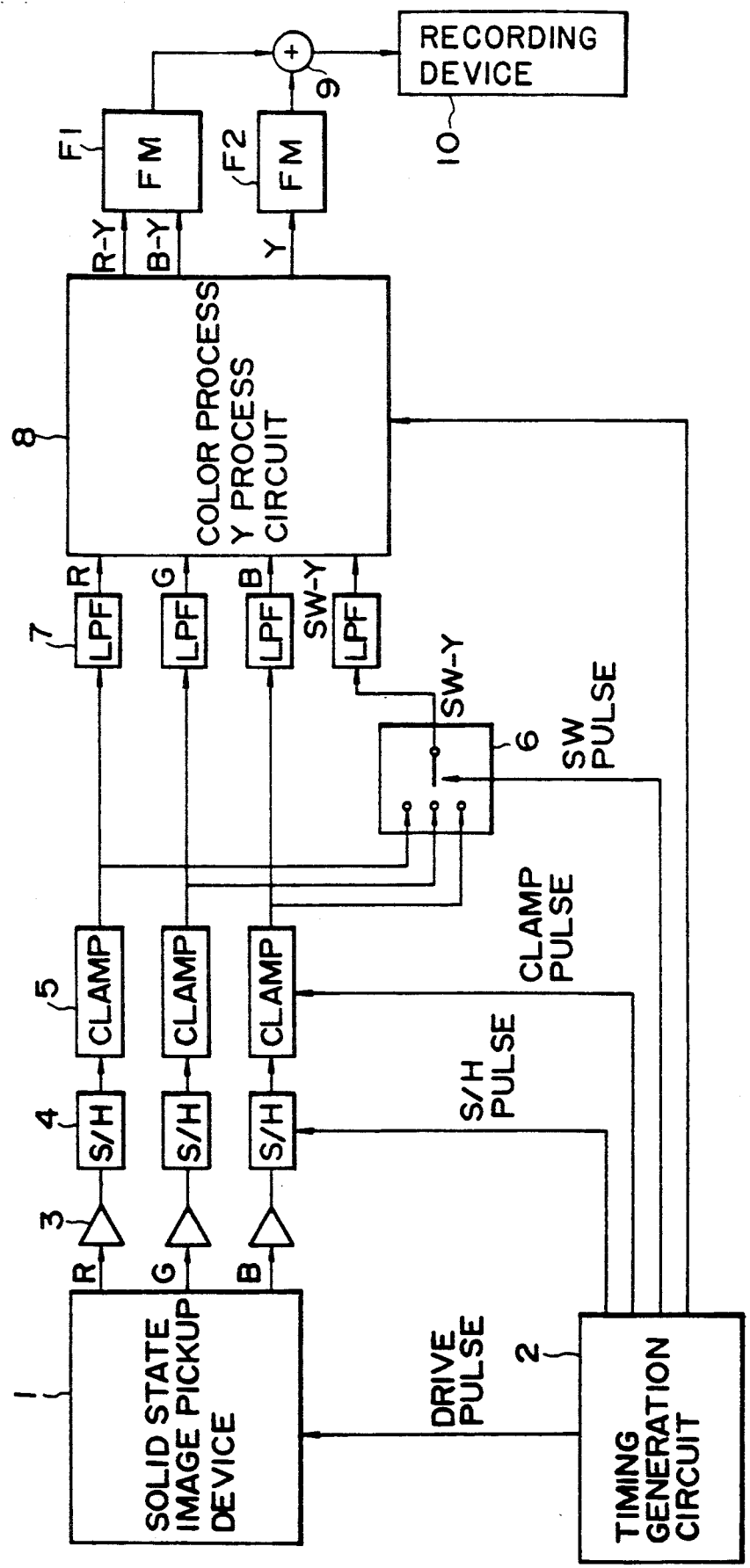
FIG. 4 is a block diagram showing a first embodiment of the image pickup apparatus according to this invention.
Figure 5:
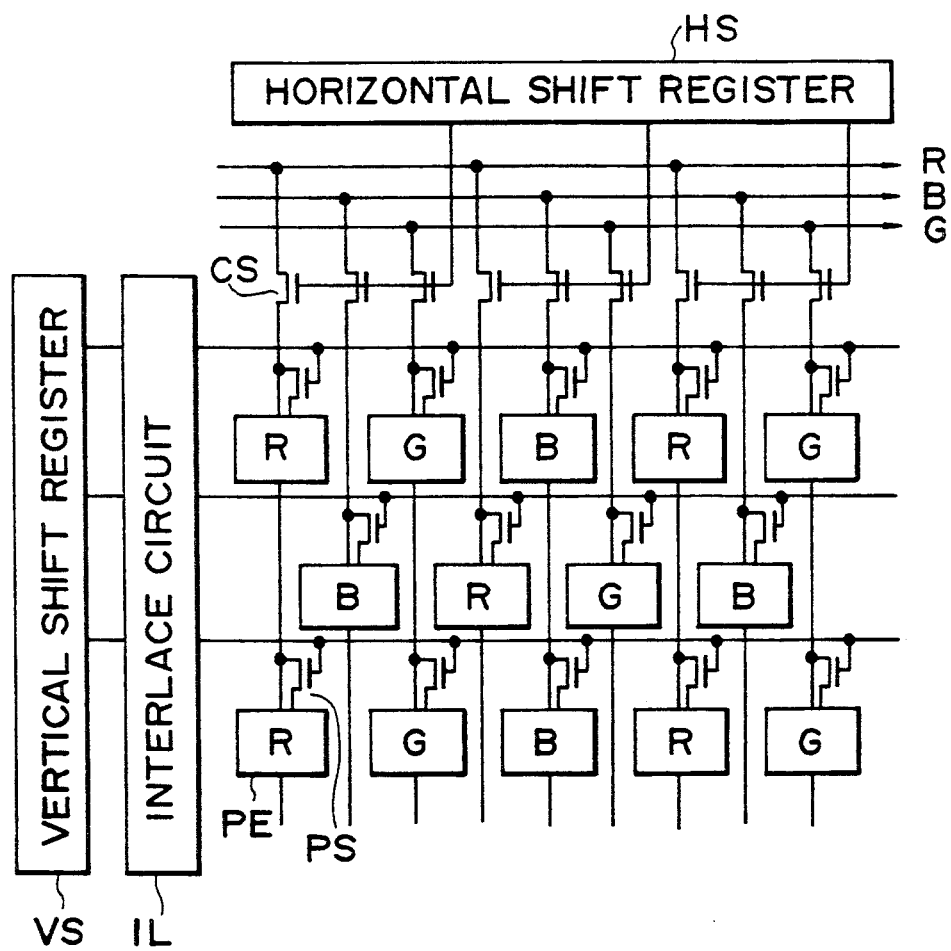
FIG. 5 shows the structure of the MOS type image pickup device of the first embodiment.
Figure 6:
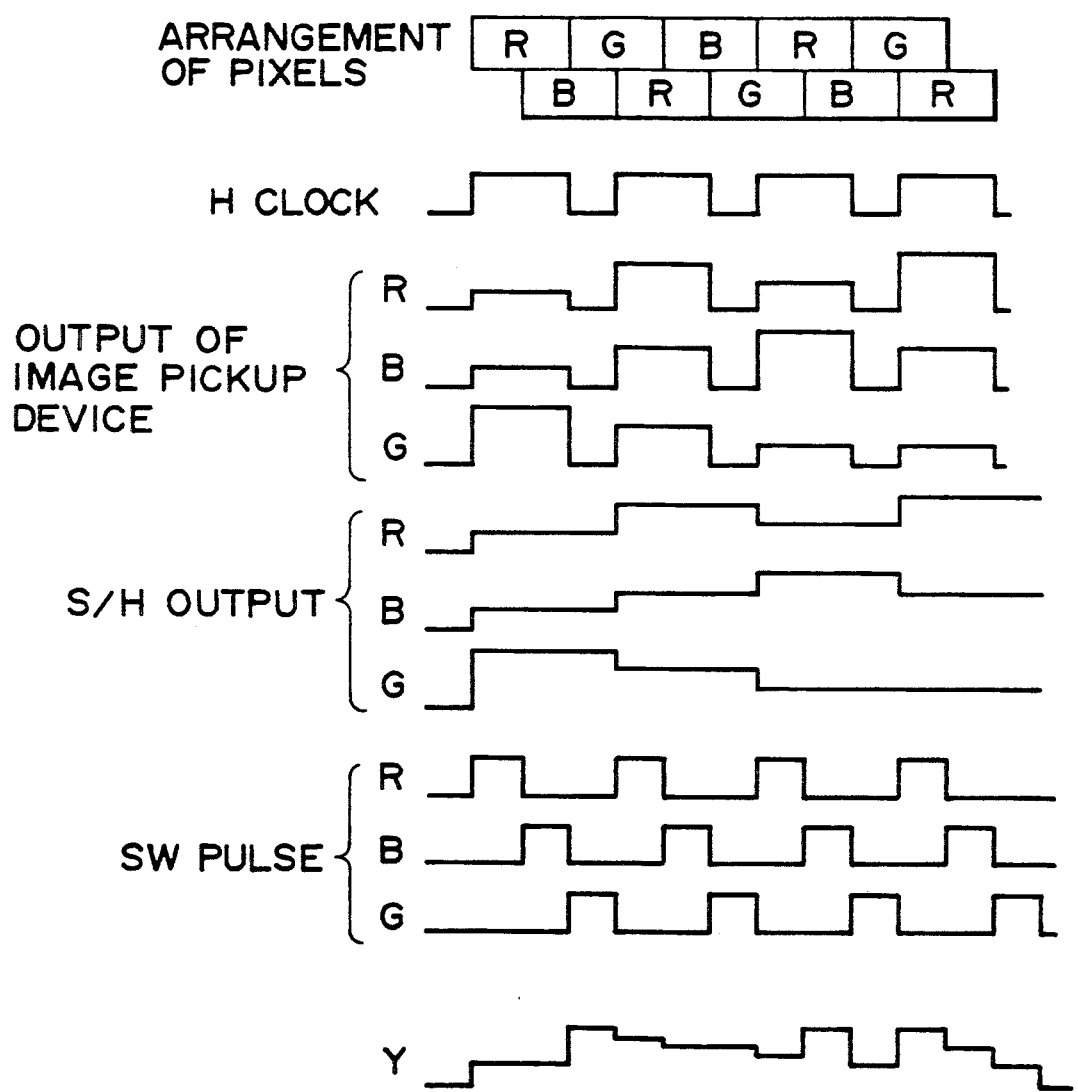
FIG. 6 is a timing chart illustrating the operation of reading signals from the image pickup device shown in FIG. 5.

FIG. 4 is a block diagram showing a single CCD area array type color image pickup apparatus using a solid state image pickup device according to this invention. In the Figure, a solid state image pickup device 1 may use an X-Y address type image pickup device as shown in FIG. 5. As particularly shown in FIG. 5, R, G and B color filters are attached to the image pickup device 1 while displacing them by a ½ pixel pitch between two adjacent lines. In the present invention, if only an X-Y address type image pickup device is used wherein each pixel signal is read upon designation of horizontal and vertical addresses, it is apparent that any type of image pickup devices may be used including MOS type, SIT type, CMD type, BASIS type, with or without uni-junction transistors, and other types. The solid state image pickup device 1 is driven by drive pulses generated by a timing generation circuit 2 to obtain R, G and B three output signals.

R, G and B signals are applied to respective pre-amplifiers 3 to remove spike current therefrom, sampled and held at sample-hold circuits 4, and then applied to clamp circuits 5 to fix the black level potential.

Using the three primary color signals, a luminance signal is calculated. For example, the luminance signal for a three CCD areas array type image pickup apparatus is calculated through addition in the equation of $Y = 0.3\,R + 0.59\,G + 0.11\,B$. For a single CCD area array type image pickup apparatus, if the same additional signal is used for calculating the luminance signal, the horizontal resolution is degraded. In consideration of this, as shown in FIG. 5, the signals read out in synchronism with the horizontal selection pulses (H clocks) outputted from the horizontal shift register are supplied to the pre-amplifiers 3. The output signals from the pre-amplifiers 3 are sampled and held in synchronism with sample-hold pulses (S/H pulses). The sampled and held signals are selectively switched at a switching circuit 6 in synchronism with switch pulses (SW pulses) generated by the timing generation circuit 2. Specifically, the signals are sequentially gated by switch pulses of high level, to generate a luminance signal. In such a manner the resolution can be improved.

The luminance signal thus obtained, as well as the R, G and B primary color signals, are subjected to band-elimination at low-pass filters LPF 7, and to white balance, gamma correction and matrix calculation at a color process circuit 8, to thereby obtain luminance signal Y and color difference signals R−Y and B−Y. The luminance signal Y is directly supplied to an FM modulator F2, whereas the (R−Y) and (B−Y) signals are first line-sequentialized and thereafter supplied to an FM modulator F1. After modulation, they are added together at an adder 9, and the addition result is recorded in a recording device 10.

Figure 7:
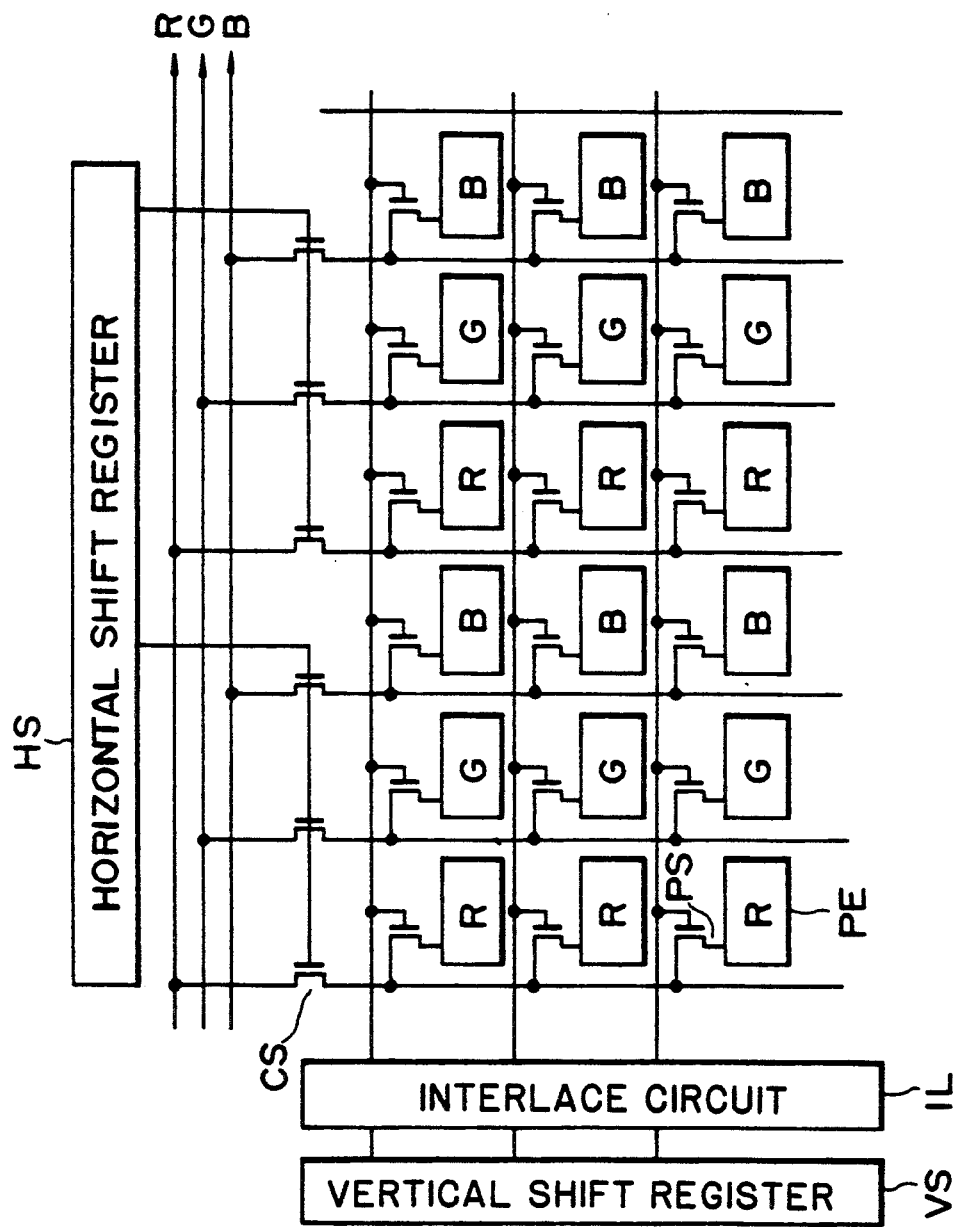
FIG. 7 shows the pixel arrangement of an image pickup device according to another embodiment of this invention.

The frequency of switch pulses (SW pulses) shown in FIG. 5 is 1.5 times as high as that for interlaced scanning, with one line reading from frame storage, of a solid state image pickup device with pixel disposal as shown in FIG. 5. The image pickup device shown in FIG. 4 may use the image pickup device with pixel disposal as shown in FIG. 7. In this case, the same frequency as high as 1.5 times is used.

With the image pickup apparatus constructed as above, there is no need for high precision delay lines conventionally used for correcting a misalignment between image pickup device output signal timings and spatial positions, thus readily obtaining an image of high horizontal resolution.

Figure 8:
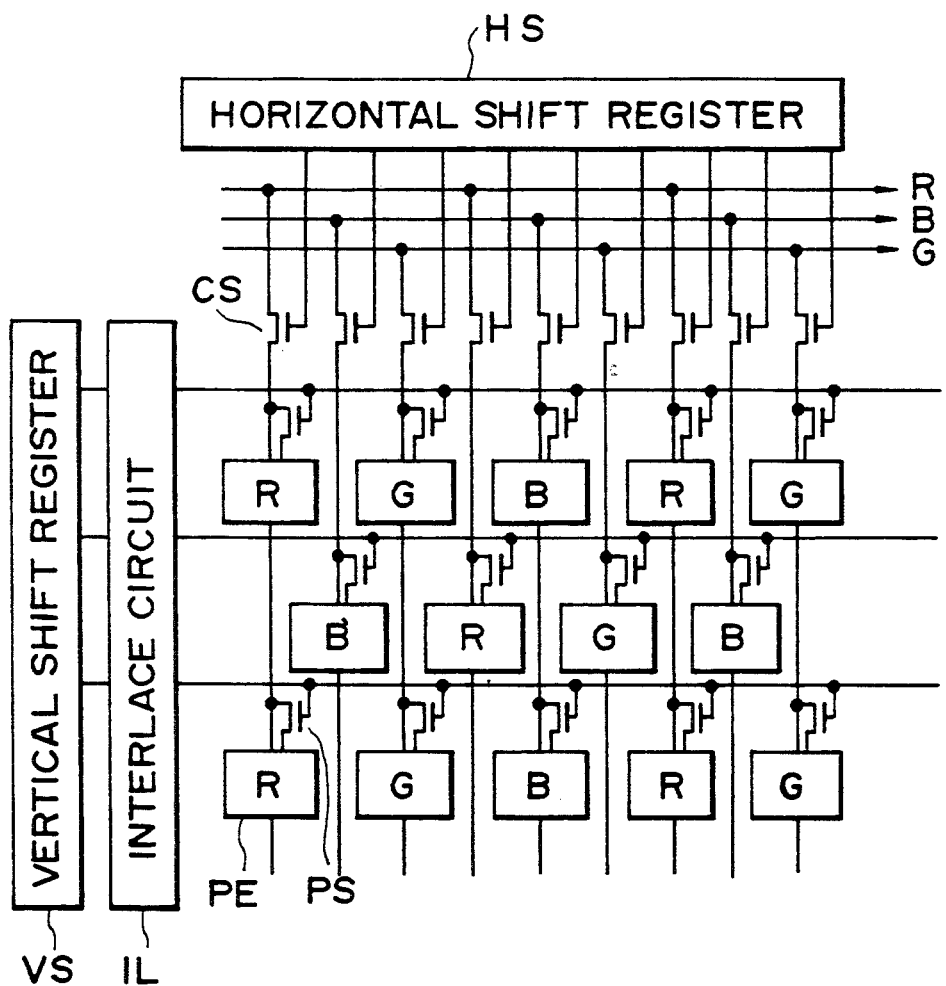
FIG. 8 shows the structure of an X-Y address type image pickup device according to a second embodiment of this invention.

FIG. 8 shows the second embodiment of this invention. In obtaining a frame image by using the solid state image pickup device shown in FIG. 8, if interlaced scanning with one line reading from frame storage is performed in a moving image taking mode, then frame residual images appear. Therefore, in this embodiment, a frame image is obtained through two line simultaneous reading. In a still image taking mode, the shutter is opened only during light exposure and closed after the exposure, and interlaced scanning with one line reading is performed to obtain a frame image. Therefore, a frame image can be obtained through two line simultaneous reading.

Figure 9:
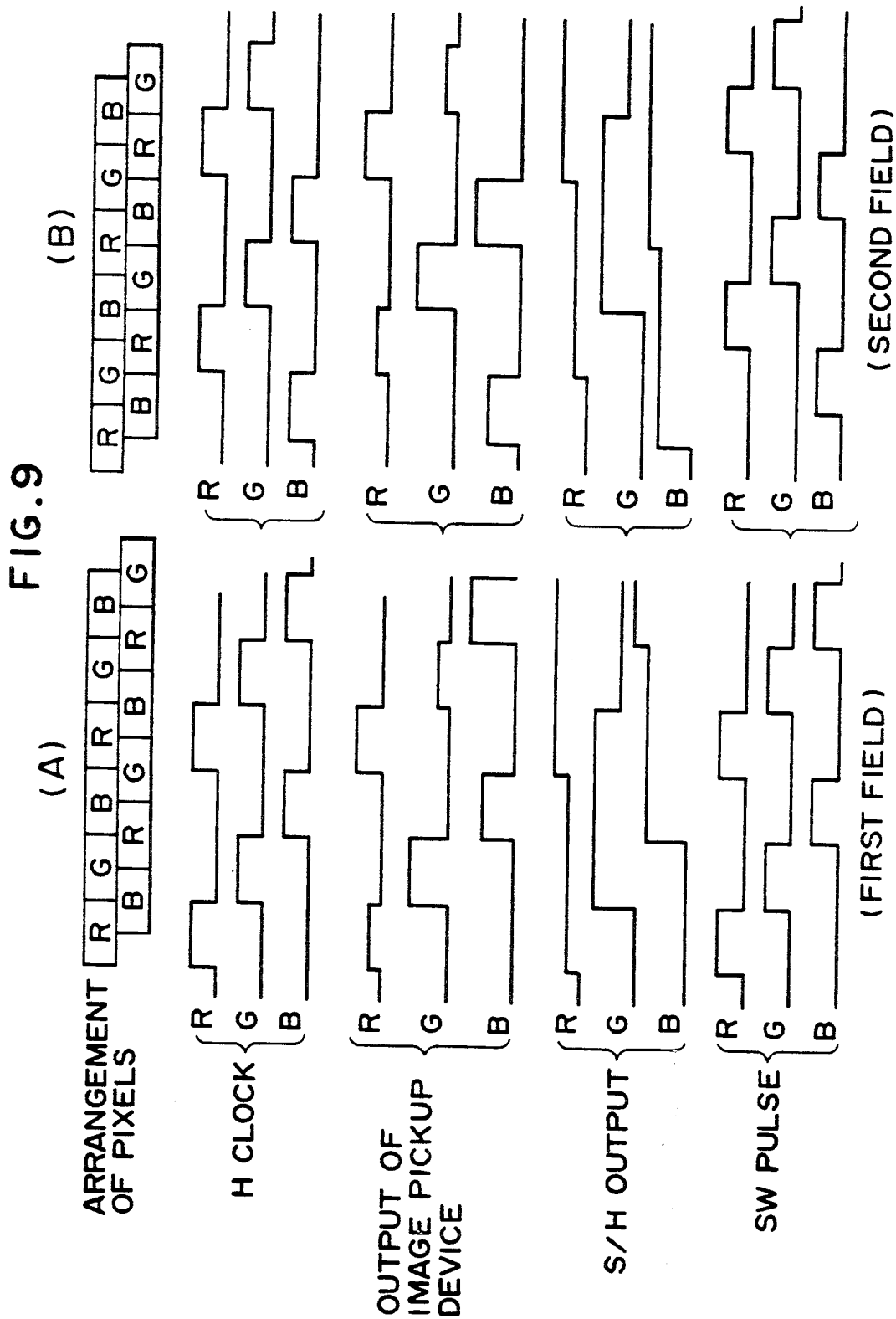
FIGS. 9(A) and 9(B) are timing charts illustrating the operation of reading signals from the image pickup device shown in FIG. 8.

FIGS. 9(A) and 9(B) illustrate how a frame image is obtained through one line reading in the still image taking mode. As shown in FIG. 9(A), signals in the first field read in synchronism with horizontal selection pulses are sampled and held, and thereafter selectively switched in synchronism with switch pulses same in phase with horizontal selection pulses, to thereby obtain a luminance signal.

Pixels in the second field are displayed by a ½ pixel pitch relative to pixels in the first field as shown in FIG. 9(B). The misalignment is corrected not by shifting horizontal selection pulses, but by shifting the phase of switch pulses (SM pulses) so as to match pixel spatial positions, as seen from FIG. 9(B). Therefore, the phases of switch pulses in the first and second fields are shifted by 180 degrees. This arrangement can also enjoy the same effects as the first embodiment.

In the first and second embodiments, R, G and B pure color filters have been used. However, it is apparent that complimentary color filters such as W, Ye and Cy may be used with the same advantageous effects.

As described so far, according to the solid state image pickup device of this invention, in producing a luminance signal by selectively switching color output signals, the phase of switching pulses is shifted by 180 degrees between the first and second fields in the case of interlaced scanning with one line reading from frame storage. In the case of two line simultaneous reading, the frequency of switching pulses is made 1.5 times as high as that for interlaced scanning with one line reading from frame storage. Therefore, the present invention can readily obtain an image of high horizontal resolution without using conventional high precision delay lines.

What is claimed is:

1. An image pickup apparatus comprising:
   a solid state image pickup device having a plurality of pixels disposed on plural lines;
   means for reading two lines of said pickup device at a first frequency, having a first on-period, to simultaneously output different color signals onto three output channels at the first frequency wherein; and
   switching means for generating switching pulses for dot-sequentializing the different color signals simultaneously outputted to said three output channels to obtain a luminance signal, the switching pulses having a second frequency of 1.5 times the first frequency.

2. An image pickup apparatus according to claim 1, wherein said solid state image pickup device has pixels displaced by a ½ pixel pitch between two adjacent lines.

3. An image pickup apparatus according to claim 1, wherein each line of said solid state image pickup device has a plurality of pixels, each pixel being provided with a predetermined color filter.

4. An image pickup apparatus according to claim 3, wherein the color of said predetermined color filter has a cyclic pattern that the same color is used for every third pixel in each line.

5. An image pickup apparatus according to claim 3, wherein said three output channels deliver corresponding color signals.

6. An image pickup apparatus according to claim 5, further comprising a color signal generating circuit for generating specific color signals by using the outputs from said three output channels.

7. An image pickup apparatus according to claim 1, wherein said reading means selectively uses a still mode wherein pixels are read from every second lines.

8. An image pickup apparatus according to claim 7, wherein said reading means causes to shift the phase of said switching pulses between first and second fields by 180 degrees in said still mode.

9. An image pickup apparatus comprising:
a solid state image pickup device having pixels disposed in a plurality of horizontal lines, every two adjacent horizontal lines defining first and second fields, respectively, said pixels being displaced by a ½ pixel pitch between said two adjacent horizontal lines;
means for reading every other horizontal line of said plurality of horizontal lines and outputting different color signals onto a plurality of channels; and
luminance signal generating means for generating switching pulses for dot-sequentializing the different color signals outputted to said plurality of channels to form a luminance signal, said switching pulses having a phase shift corresponding to the ½ pixel pitch displacement of the pixels between the first and second fields.

10. An image pickup apparatus according to claim 9, wherein said plurality of channels comprise three channels.

11. An image pickup apparatus according to claim 9, wherein each line of said solid state image pickup device has a plurality of pixels, each pixel being provided with a predetermined color filter.

12. An image pickup apparatus according to claim 11, wherein the color of said predetermined color filter has a cyclic pattern that the same color is used for every third pixel in each line.

13. An image pickup apparatus according to claim 9, wherein each of said plurality of channels correspond to one of the different color signals.

14. An image pickup apparatus according to claim 13, further comprising a color signal generating circuit for generating specific color signals by using the outputs from said plurality of channels.

15. An image pickup apparatus according to claim 9, wherein said reading means selectively uses a mode in which two horizontal pixel lines are simultaneously read.

16. An image pickup apparatus according to claim 9, wherein the phase shift if 180 degrees between the first and second fields.

17. An image apparatus comprising:
(a) solid state image pickup means having a plurality of photoelectric conversion elements for photoelectrically converting light from an object, said plurality of photoelectric conversion elements being arranged in a matrix form;
(b) read-out means for reading out a signal from said solid state image pickup means, said read-out means having a first mode in which signals of one horizontal line of said plurality of photoelectric conversion elements are sequentially read out in a horizontal direction and converted into N channel signals, N being a predetermined integer, and a second mode in which signals of two horizontal lines, adjacent to each other in the vertical direction, are read out alternately every pixel and are converted into N channel signals; and
(c) dot-sequentialization means for converting the N channel signals provided by said read-out means into a one channel dot-sequential signal by sampling the N channel signals by a sampling signal of a predetermined frequency, the predetermined frequency of the sampling signal being higher in the second mode than in the first mode.

18. An image pickup apparatus according to claim 17, wherein the horizontal lines of said plurality of photoelectric conversion elements are offset each other in the horizontal direction by a half pitch.

19. An image pickup apparatus according to claim 17, wherein in each horizontal line of said plurality of photoelectric conversion elements, three color filters are arranged corresponding to each pixel, and wherein the predetermined frequency of the sampling signal in the second mode is 1.5 times higher than in the first mode.

* * * * *

UNITED STATES PATENT AND TRADEMARK OFFICE
CERTIFICATE OF CORRECTION

PATENT NO. : 5,150,204
DATED : September 22, 1992
INVENTOR(S) : YASUYUKI YAMAZAKI It is certified that error appears in the above-identified patent and that said Letters Patent is hereby corrected as shown below:

COLUMN 1

Line 31, "spacial" should read --spatial--.

COLUMN 2

Line 40, "system." should read --systems.--.

COLUMN 5

Line 19, "lines." should read --line.--.

COLUMN 6

Line 4, "correspond" should read --corresponds--.
Line 15, "if" should read --is--.
Line 43, "offset" should read --offset from--.

Signed and Sealed this

Ninth Day of November, 1993

Attest:

BRUCE LEHMAN

Attesting Officer

Commissioner of Patents and Trademarks